Patented Jan. 2, 1945

2,366,633

UNITED STATES PATENT OFFICE 2,366,633

METALIZED AZO DYESTUFFS

Robert Sidney Long, Martinsville, N. J., assignor to American Cyanamid Company, New York, N. Y., a corporation of Maine No Drawing. Application September 16, 1942, Serial No. 458,566

17 Claims. (Cl. 260—148)

This invention relates to a new class of metalized azo dyestuffs having as one component of the molecule an acylacetonitrile.

The dyes of the present invention are metal complexes of dyes which may be represented by the following formula:

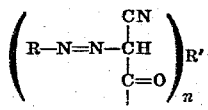

in which R is a residue of a diazotized amine which may contain other azo groups, there being present at least one hydroxyl or carboxyl group ortho to the azo group, R' is a cyclic radical which may be aromatic, aralkyl or hydroaromatic, and $n$ is an integer in the group consisting of 1 and 2.

The metalized dyes of the present invention may contain any suitable metal capable of forming a complex with the dye, but I prefer to use metals having an atomic weight between 52 and 64.

The dyes to be metalized are themselves new chemical compounds, but are not claimed as such in the present application, forming the subject matter of my copending application, Serial Number 458,567 filed Sept. 16, 1942.

The acylacetonitriles used in preparing the azo dyes in the present invention may be represented by the following formula:

in which R' is a cyclic radical of the aromatic, aralkyl or hydroaromatic series and $n$ is an integer in the group consisting of 1 and 2. Where $n$ is 2 there will be 2 acetonitrile groups and the azo dyes produced will have two azo groups. The formula at first glance would appear to represent dyes which would not be susceptible to metalization as the azo acetonitrile does not appear to have metalizable groups ortho to the azo group. However, I have found that the acylacetronitrile when part of an azo dye exists in equilibrium with a tautomeric enol form, providing the necessary hydroxyl group ortho to the azo group to permit metalization. The dyes are readily metalized by the ordinary methods and show excellent all around fastness. It is an advantage of the present invention that the new series of metalized dyes may be prepared by the standard methods of metalization and that no new techniques are required.

The diazo compounds useful in preparing the azo dyes to be metalized should contain a group ortho to the diazo group which can be converted into a metal complex. The most common groups of this type are hydroxyl and carboxyl. The following diazo components are typical of those from which these azo dyes can be prepared: 2-amino-4-nitrophenol, 2-amino-5-nitrophenol, 2-amino-4-chlorophenol, 3-amino-4-hydroxybenzenesulfonic acid, 2-methyl-4-amino-5-hydroxy-benzene-sulfonic acid, 2-nitro-4-amino-5-hydroxybenzenesulfonic acid, 2-hydroxy-3-amino-5-chlorobenzenesulfonic acid, 3-amino-4-hydroxy-5-nitrobenzenesulfonic acid, 2-hydroxy-3-amino-5-nitrobenzenesulfonic acid, 2-hydroxy-3-amino-5-sulfobenzoic acid, 2-amino-5-sulfobenzoic acid, anthranilic acid, 1-amino-2-hydroxy naphthalene-4-sulfonic acid, 1-amino-2-hydroxy-6-nitronaphthalene-4-sulfonic acid, 2-amino-3-hydroxybenzoic acid.

The diazo compound may be also further substituted by azo groups and the acylacetonitriles of the present invention may be used also as end components in polyazo dyes.

The other component of the azo dyes, namely the acylacetonitriles, may be aromatic acylacetonitriles of the benzene, naphthalene and acenaphthene or biphenyl series. Other condensed ring polynuclear acetonitriles may also be used, but their higher cost renders them of less economic interest.

The aromatic acetonitriles may also include heterocyclic compounds of which those belonging to the furan series, such as alpha-furoyl-acetonitrile are of particular interest. Other heterocyclic acetonitriles such as those containing pyridine, quinoline and similar nitrogen containing rings may also be employed.

A number of valuable dyes may be produced from aromatic acylacetonitriles in which the aromatic radical is unsubstituted. The invention, however, is in no sense limited thereto, and in addition to typical unsubstituted aryl acetonitriles such as the benzoylacetonitrile, alpha or beta-naphthoylacetonitrile, 5 - cyanoacetylacenaphthene and 4,4'-bis-(cyanoacetyl)-biphenyl, substituted compounds may also be used. Typical examples of substituted compounds are: p-toluylacetonitrile, m-nitrobenzoylacetonitrile, the m-aminobenzoylacetonitrile, the 4-chlorobenzoylacetonitrile, the 3,4-dichlorobenzoylacetonitrile, the 4-hydroxybenzoylacetonitrile, the 2- and the 4-methoxybenzoylacetonitrile, the 2,4-dimethoxybenzoylacetonitrile, the 3,4,5-trimethoxybenzoylacetonitrile, the 2-methoxy-3-naphthoylacetonitrile, the 3-carboxybenzoylacetonitrile, the alpha-naphthoylacetonitrile monosulfonic acid and the 2-methoxy-5-sulfobenzoylacetonitrile.

A typical aralkyl acetonitrile is phenacetylacetonitrile and typical acylacetonitriles of the hydroaromatic series are hexahydrobenzoylacetonitrile and 6-cyanoacetyl-1,2,3,4-tetrahydronaphthalene.

It is an advantage of the dyestuffs of the present invention that the common complex forming metals may be introduced. In general the most important of these metals have atomic weights between 52 and 64, namely chromium, manganese, iron, cobalt, nickel, and copper. The chromium complexes are of particular value in dyeing wolo, while for dyeing cotton the copper complexes are, in general, preferable.

It is an advantage of the present invention that the metalization proceeds readily in the ordinary manner, and no particular problems are encountered. In general it is desirable to reflux an aqueous solution of the dye with salts or other suitable compounds of the metal or metals to be introduced. Typical compounds are: chromic hydroxide, chromic acetate, chromic formate, chromic fluoride, chromic chloride, basic chromic chloride, chromic sulfate, basic chromic sulfate, chromic benzene sulfonate, chromic naphthalene disulfonates and chromic chromate. Corresponding salts of the other metals may be employed. The metalizing agents may be used with or without various agents to control the pH, such as acids, bases, buffers and the like. The reaction may also proceed in the presence of ammonia or amines. In some cases it is desirable to introduce a plurality of metals and such dyes are included in the scope of the present invention.

The invention will be described in greater detail in conjunction with the following examples which are typical illustrations. The parts are by weight.

Example No. 1

The azo dye corresponding to the following formula:

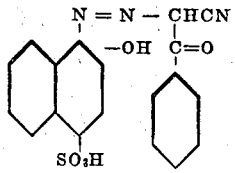

is obtainable by the coupling of the diazo compound of 1-amino-2-hydroxy-4-naphthalenesulfonic acid with benzoylacetonitrile in alkaline solution. The dye is metalized by refluxing 159.6 parts of the dye with 1520 parts of water and 960 parts of basic chromic acetate containing 26 grams of chromium per liter. After refluxing for a short time, 1560 parts of water and 140 parts of N/5 sulfuric acid are added. Refluxing is continued until precipitation of the metallic complex is complete. The product is then removed by filtration and washed with water. The new product dyes wool in an acid bath a bright Bordeaux tint of excellent all-around fastness properties.

The azo dye described above may also be metalized with cobalt, copper, nickel, and iron salts. A mixture of 3 parts of the dye and 2 parts of cobalt chloride hexahydrate in 150 parts of water is made faintly acid to Congo red test paper and then buffered with 50 parts of 20% sodium acetate solution. The resulting mixture is heated at a gentle boil until metalization is complete. The product is removed by filtration. The product dyes wool a pinkish-red shade of excellent fastness properties.

The metalizations of this dye with nickel, copper, and iron salts are carried out according to a similar procedure. Using the same amount of dye, there is needed 2.2 parts of nickel sulfate hexahydrate, 1.7 parts of copper acetate monohydrate, and 3.3 parts of ferrous ammonium sulfate hexahydrate. The nickel complex dyes wool a yellow-red shade of excellent fastness properties. The copper complex gives a bluish shade of red, also of good fastness properties and the iron complex gives an olive-brown shade.

Example No. 2

The azo dye corresponding to the following formula:

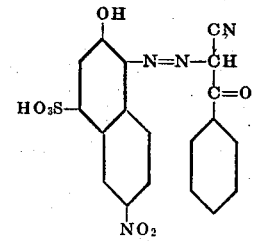

and obtained by the coupling of the diazo compound of 1-amino-2-hydroxy-4-sulfo-6-nitro-naphthalene with benzoylacetonitrile in alkaline solution, is metalized in the following manner. A suspension of 4.4 parts of the dye in 15 parts of basic chromic acetate containing 52 grams of chromium per liter and 100 parts of water is heated under reflux for a short time and then to the solution is added 42 parts of water in 35 parts of N/1 sulfuric acid. The refluxing is continued until precipitation of the metalized dye is complete. The product is then removed by filtration and washed with water. The product dyes wool a bright red shade of good fastness properties.

The azo dye described above is metalized with nickel by suspending two parts of the dye and 1.3 parts of nickel sulfate hexahydrate in 50 parts of water, adding hydrochloric acid until the solution is just acidic to Congo red test paper, then adding 20 parts of a 20% sodium acetate solution, and refluxing until metalization is complete. The product is removed by filtration. It dyes wool a rust shade of extremely good fastness to light and excellent all-around fastness properties.

This same dye may also be metalized with cobalt according to a similar procedure but using 2.2 parts of the dye and 1.3 parts of cobalt chloride hexahydrate. This new product dyes wool a bright yellow-red shade of excellent fastness properties.

Example No. 3

The azo dye corresponding to the formula:

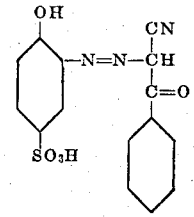

and obtained by the coupling of the diazo compound of 3-amino-4-hydroxybenzene sulfonic acid with benzoylacetonitrile in alkaline solution is metalized in the following manner. A suspension of 8.8 parts of the dye in 85 parts of water and 30 parts of basic chromic acetate containing 52 grams of chromium per liter is heated under reflux for a short time and to the resulting solution is added 14 parts of water and 70 parts of normal sulfuric acid. Refluxing is continued until precipitation of the metalized dye is complete. The product is then removed by filtration, washed with water, and dried. The product dyes wool a bright red tint of good fastness properties.

The azo dye described above may also be metalized with nickel, iron, and copper salts. In each case a solution of 2.6 parts of the dye, the correct amount of the metallic salt, and 150 parts of water is made just acidic to Congo red test paper with hydrochloric acid and to the resulting solution is added 50 parts of a 20% sodium acetate solution. The solution is heated at a gentle boil for about 4 hours and the product is isolated by salting. The amount of metallic salt needed in each case is 2.2 parts of nickel sulfate hexahydrate, 1.7 parts of copper acetate monohydrate, and 3.3 parts of ferrous ammonium sulfate hexahydrate. The nickel complex dyes wool a bright orange shade and the copper complex a yellow-brown shade. Both are of good fastness properties. The iron complex gives a tan shade when dyed on wool.

*Example No. 4*

The azo dye corresponding to the following formula:

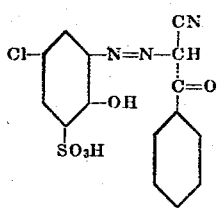

and obtained by the coupling of the diazo compound of 2-hydroxy-3-amino-5-chlorobenzene sulfonic acid with benzoylacetonitrile in alkaline solution, is metalized by refluxing a suspension of 7.6 grams of the dye with 100 parts of water and 24 parts of basic chromic acetate solution containing 52 grams of chromium per liter. After refluxing for a short time, there is added 43 parts of water and 33 parts of normal sulfuric acid. Refluxing is then continued until precipitation of the dyestuff is complete. The metalized dye so obtained is removed by filtration, washed with water and dried at 60° C. The product dyes wool an attractive red shade of good fastness properties.

*Example No. 5*

The azo dye corresponding to the following formula:

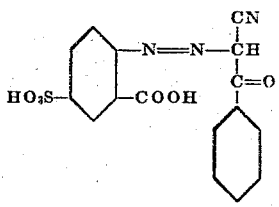

and obtained by the coupling of the diazo compound of 2-amino-5-sulfobenzoic acid with benzoylacetonitrile in alkaline solution, is metalized in the following manner. A suspension of 4.2 parts of the dye in 25 parts of water and 12 parts of basic chromic acetate solution containing 52 grams of chromium per liter is heated under reflux for a short time and to the resulting solution is added 10 parts of water and 5 parts of normal sulfuric acid. The reaction mixture is then heated under reflux for about 24 hours. Excess chromium salts are removed by the addition of soda ash and filtration and the product is then isolated from the filtrate by the addition of salt. The product dyes wool a bright greenish-yellow shade of good fastness properties.

*Example No. 6*

The azo dye corresponding to the following formula:

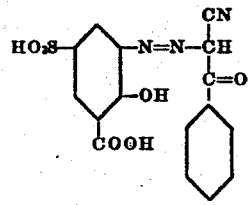

and obtainable by the coupling of the diazo compound of 2-hydroxy-3-amino-5-sulfobenzoic acid with benzoylacetonitrile in alkaline solution is metalized in the following manner. A solution of 5.2 parts of the dye in 50 parts of water and 15 parts of basic chromic acetate solution containing 52 grams of chromium per liter is heated under reflux for a short time and then to it is added two parts of water and 35 parts of normal sulfuric acid. The metalization is completed by refluxing a number of hours. The product is isolated by evaporation to a smaller volume and cooling. It dyes wool an attractive shade of yellow of good all-around fastness properties.

*Example No. 7*

The azo dyestuff corresponding to the following formula:

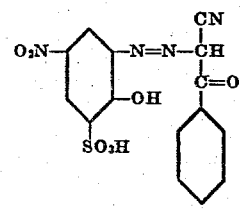

and obtainable by the coupling of the diazo compound from 2-hydroxy-3-amino-5-nitrobenzene sulfonic acid with benzoylacetonitrile in weakly alkaline solution is metalized in the following manner. A solution of 5.2 parts of the dye in 50 parts of water and 15 parts of basic chromic acetate solution containing 52 grams of chromium per liter is heated under reflux for a short time and then to it is added two parts of water and 35 parts of N/1 sulfuric acid. Refluxing is continued until precipitation of the metalized dye is complete. The product is then removed by filtration, washed with water and dried at 60° C. The new product dyes wool a bright yellowish-orange shade which is very attractive and has, in general, good fastness properties.

*Example No. 8*

The azo dye corresponding to the following formula:

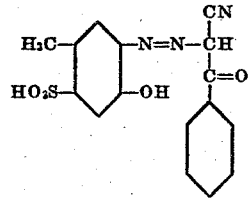

and prepared by the condensation of 2-methyl-4-amino-5-hydroxybenzene sulfonic acid with benzoylacetonitrile in alkaline solution is metalized according to the following procedure. A solution of 7.9 parts of the sodium salt of the dyestuff in 76 parts of water and 24 parts of basic chromic acetate solution containing 52 grams of chromium per liter is heated under reflux for a short time and then to it is added 35 parts of water and 50 parts of normal sulfuric acid. The mixture is refluxed until precipitation of the dye is complete and the metalized product is then removed by filtration and washed with water. This new metalized dye dyes wool a red shade of good fastness properties.

Example No. 9

The diazo dye corresponding to the following formula:

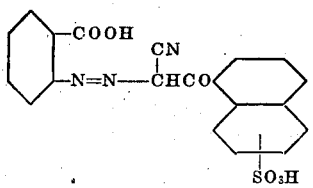

and obtainable by the coupling of anthranilic acid diazo with sulfo-1-naphthoyl acetonitrile in weakly alkaline solution is metalized in the following manner:

A solution of 6 parts of the dye in 50 parts of water and 30 parts of a basic chromic acetate solution containing 26 parts of chromium per liter is heated under reflux for a short period and then to it is added 40 parts of normal sulfuric acid and 30 parts of water. Refluxing is continued for a number of hours and the product is then removed by filtration. This new product dyes wool a brilliant greenish-yellow shade.

Example No. 10

A suspension of 2.4 parts of the dyestuff corresponding to the following formula:

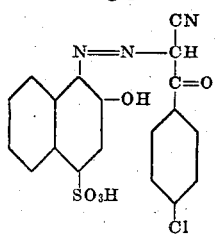

obtained by coupling 4-chlorobenzoylacetonitrile with the diazo compound from 1-amino-2-hydroxy-4-naphthalenesulfonic acid in alkaline solution, in 30 parts of water and 8 parts of N/1 basic chromic acetate is heated under reflux until a clear solution is obtained. To the refluxing solution is added 17.5 parts of N/1 sulfuric acid and refluxing is then continued for a number of hours. The precipitated metalized dye is removed by filtration and washed with water. The product dyes wool a rich Bordeaux shade of good fastness properties.

Example No. 11

The dyestuff of the following formula:

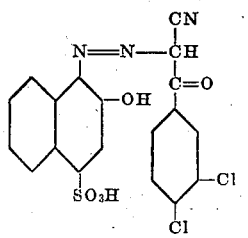

obtainable by the coupling of the diazo compound of 1 - amino - 2 - hydroxy-4-naphthalenesulfonic acid to 3,4-dichlorobenzoylacetonitrile in alkaline solution is metalized in the following manner. A suspension of three parts of the dyestuff in 50 parts of water and 7.2 parts of N/1 basic chromic acetate is heated under reflux until a complete solution is obtained. To the solution is added 33 parts of water and 10 parts of N/1 sulfuric acid. Refluxing is then continued for a number of hours. The metallic complex which is precipitated in good yield is removed by filtration and dried at 60°. It dyes wool, in an acid bath, a bluish-Bordeaux shade of excellent fastness properties.

The 3,4-dichlorobenzoylacetonitrile used in the above example is prepared by reaction of 21 parts of methyl 3,4-dichlorobenzoate with 10.3 parts of acetonitrile and 11.4 parts of sodium methylate at 80–100°. When the reaction is complete, the product is isolated by the addition of water, filtration, and acidification of the filtrate. It has a melting point of 105–107°. The methyl 3,4-dichlorobenzoate is obtained by esterification of 57.3 parts of 3,4-dichlorobenzoic acid with 115 parts of methyl alcohol and 1.7 parts of sulfuric acid. The product is isolated in the usual manner and melts at 45–47°.

Example No. 12

The azo dyestuff of the following formula:

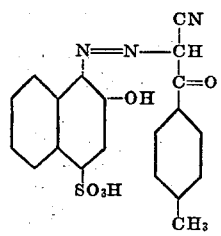

obtained by the coupling of the diazo compound of 1-amino-2-hydroxynaphthalene-4-sulfonic acid with 4-methylbenzoylacetonitrile in alkaline solution, is metalized in the following manner. 4.1 parts of the dye is heated under reflux with 112 parts of water and 12.5 parts of a basic chromic acetate solution containing 52 parts of chromium per liter until a clear solution is obtained and then there is added 42 parts of water and 33 parts of normal sulfuric acid. Refluxing is continued for a number of hours and the precipitated metallic complex is removed by filtration and washed with water. The product dyes wool a bright Bordeaux shade of excellent fastness to light, washing, and fulling.

Example No. 13

The dyestuff of the following formula:

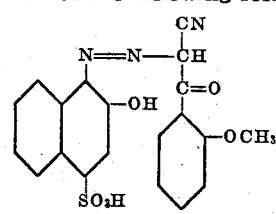

prepared by the coupling of the diazo compound of 1-amino-2-hydroxy-4-naphthalenesulfonic acid with 2-methoxybenzoylacetonitrile in alkaline solution, is metalized by refluxing 11.5 parts of the dye with 105 parts of water and 30 parts of a basic chromic acetate solution containing 52 grams of chromium per liter. After refluxing for a short time, there is added 47 parts of water and 35 parts of normal sulfuric acid. Refluxing is continued until precipitation of the metallic complex is complete and it is then removed by filtration and washed with water. The product dyes wool in an acid bath a bright yellowish-Bordeaux tint of excellent fastness to light, washing, and fulling.

The 2-methoxybenzoylacetonitrile used in the above example is prepared by reaction of 33.2 parts of methyl 2-methoxybenzoate with 11.4 parts of sodium methylate and 10.3 parts of acetonitrile. The reaction is carried out by heating for several hours at 80–100°, and the product is isolated by solution of the reaction mixture in water and acidification with mineral acid. The melting point of the purified product is 87°.

*Example No. 14*

The azo dye corresponding to the following formula:

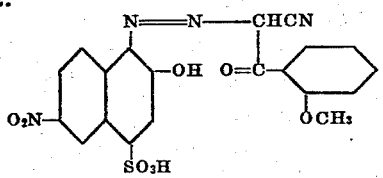

and obtained by the coupling of the diazo compound of 1-amino-2-hydroxy-6-nitro-4-naphthalenesulfonic acid with 2-methoxybenzoylacetonitrile in alkaline solution is metalized in the following manner. A mixture of 4.8 parts of the dye in 40 parts of water and 11.2 parts of a basic chromic acetate solution containing 58.2 parts of chromium per liter is heated under reflux for a short time and then to it is added 50 parts of water and 7 parts of N/5 sulfuric acid. Refluxing is then continued until precipitation of the product is complete. The metalized dye is removed by filtration, washed with water, and dried. The yield is excellent. The product dyes wool an extremely attractive bright red tint of very good all-around fastness properties.

*Example No. 15*

The azo dye of the following formula:

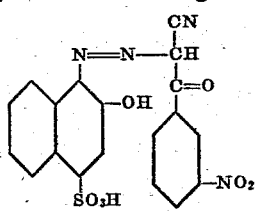

obtainable by the coupling of the diazo compound of 1-amino-2-hydroxy-4-naphthalenesulfonic acid with 3-nitrobenzoylacetonitrile in alkaline solution, is metalized by heating 3.4 parts of the dye under reflux with 38 parts of water and 9 parts of a basic chromic acetate solution containing 52 grams of chromium per liter. After refluxing for a short time, six parts of water and 26.2 parts of normal sulfuric acid are added and refluxing is then continued for about 20 hours. The addition of salt to the reaction mixture precipitates the dye in good yield. The product dyes wool a pleasing violet tint of good fastness properties.

*Example No. 16*

The dyestuff of the following formula:

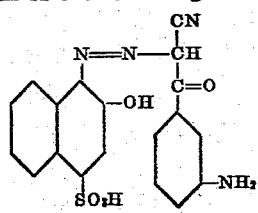

obtained by the coupling of the diazo compound of 1-amino-2-hydroxy-4-naphthalenesulfonic acid with 3-aminobenzoylacetonitrile in alkaline solution is metalized in the following manner. 2.7 parts of the dyestuff is heated under reflux with 58 parts of water and 8 parts of a basic chromic acetate solution containing 52 grams of chromium per liter. After refluxing for a short time, 17 parts of water and 17 parts of normal sulfuric acid are added. Refluxing is then continued until precipitation of the metallic complex is complete. The product is removed by filtration. The product dyes wool in an acid bath a violet-brown shade of very good fastness to light, washing, and fulling.

The 3-aminobenzoylacetonitrile used in the above example is prepared by catalytic reduction of 3-nitrobenzoylacetonitrile. The calculated quantity of hydrogen is absorbed rapidly if 9.5 parts of 3-nitrobenzoylacetonitrile, 32 parts of alcohol, and 0.5 part Raney nickel are heated in an autoclave under a hydrogen pressure of 1,000 pounds. The product is washed out of the clave with an additional amount of alcohol and water is added to the alcohol slurry to precipitate the product completely. The product after purification by solution in dilute hydrochloric acid and reprecipitation with sodium bicarbonate melts at 87–95°.

*Example No. 17*

The azo dyestuff of the following formula:

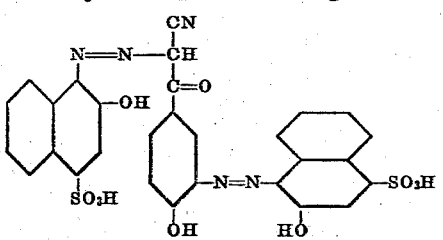

obtained by coupling the diazo compound of 1-amino-2-hydroxy-4-naphthalenesulfonic acid with 4-hydroxybenzoylacetonitrile, is metalized by refluxing 1.2 parts of the dye with 32.5 parts of water and 7.5 parts of basic chromic acetate solution containing 52 grams of chromium per liter for a short time and then adding three parts of normal sulfuric acid and containing the reflux until precipitation is complete. The precipitated dye is removed by filtration. The product dyes wool in an acid bath a reddish-brown shade.

The 4-hydroxybenzoylacetonitrile used in the above example is prepared from 4-hydroxychloroacetophenone by reaction with sodium cyanide according to procedures familiar to those skilled in the art.

*Example No. 18*

The azo dyestuff of the following formula:

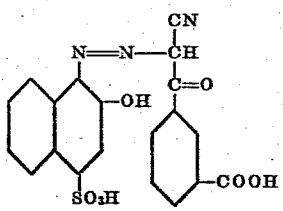

obtained by the coupling of the diazo compound of 1-amino-2-hydroxy-4-naphthalenesulfonic acid with 3-carboxybenzoylacetonitrile in alkaline solution, is metalized by refluxing 4.5 parts of the dye with 50 parts of water and 12 parts of basic chromic acetate solution containing 52 grams of chromium per liter. After refluxing for a short time, the acidity is raised by the addition of 27 parts of water and 15 parts of normal sulfuric acid. Refluxing is then continued for a number of hours and the product is isolated by the addition of salt. It dyes wool in an acid bath an attractive violet tint of good fastness to light, washing, and fulling.

The 3-carboxybenzoylacetonitrile used in the above example is prepared by reaction of 9.7 parts of dimethyl isophthalate with 5.7 parts of sodium methylate and 5.3 parts of acetonitrile. The reaction is carried out by heating at 80–100° for several hours. The reaction mixture is cooled, water is added, and the resulting solution is filtered. Acidification of the filtrate gives a tan precipitate which after purification by solution in sodium bicarbonate and reprecipitation with hydrochloric acid melts with decomposition at 170–175°. This product is 3-carboxybenzoylacetonitrile.

*Example No. 19*

The azo dyestuff of the following formula:

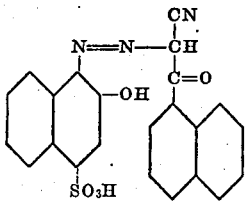

obtained by the coupling of the diazo compound of 1-amino-2-hydroxy-4-naphthalenesulfonic acid with alpha-naphthoylacetonitrile in alkaline solution, is metalized by refluxing 4.5 parts of the dye for a short time with 100 parts of water and 15 parts of basic chromic acetate solution containing 52 grams of chromium per liter and then lowering the pH by the addition of 34 parts of normal sulfuric acid. The refluxing is continued until precipitation of the metallic complex is complete, and the product is then removed by filtration. The product dyes wool in an acid bath a bright Bordeaux shade of excellent all-around fastness properties.

The alpha-naphthoylacetonitrile used in the above example is prepared by reaction of 71.9 parts of methyl alpha-naphthoate with 22 parts of sodium methylate and 19.8 parts of acetonitrile. The reaction is carried out by heating for a number of hours at 95–100°. During this time a small reaction mixture followed by the addition of water and mineral acid gives a product of good yield. It is purified by washing with sodium bicarbonate solution. After recrystallization from ethyl alcohol, the product melts at 96°–97°.

*Example No. 20*

5.3 parts of the azo dye of the following formula:

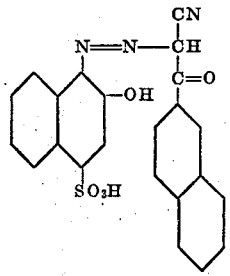

obtainable by the coupling of diazotized 1-amino-2-hydroxy-4-naphthalenesulfonic acid with beta-naphthoylacetonitrile in alkaline solution, are metalized by refluxing with 50 parts of water and 12 parts of a basic chromic acetate solution containing 52 grams of chromium per liter. Refluxing is continued for a short time and then the pH is lowered by the addition of 23 parts of water and 15 parts of normal sulfuric acid. Refluxing is continued until precipitation of the dye is complete, the reaction mixture is cooled, and the metallic complex is removed by filtration and washed with water. It dyes wool a blue Bordeaux tint of good color value and of excellent all-around fastness properties.

*Example No. 21*

2.8 parts of the azo dyestuff of the following formula:

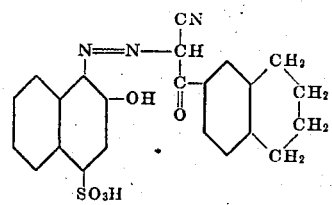

obtained by the coupling of the diazo compound of 1-amino-2-hydroxy-4-naphthalenesulfonic acid with 6-cyanoaceto-1,2,3,4-tetrahydronaphthalene in alkaline solution, are refluxed for a short time with 25 parts of water and 7 parts of basic chromic acetate solution containing 52 grams of chromium per liter. The pH is then lowered by the addition of 10 parts of water and 8 parts of normal sulfuric acid. Refluxing is continued until separation of the product is complete. It is then removed by filtration and washed with water. The product dyes wool a blue-Bordeaux shade of excellent all-around fastness properties.

The 6-cyanoaceto-1,2,3,4-tetrahydronaphthalene used in the above example is prepared by reaction of 6-chloroaceto-1,2,3,4-tetrahydronaphthalene with sodium cyanide according to procedures ordinarily used.

*Example No. 22*

The azo dyestuff of the following formula:

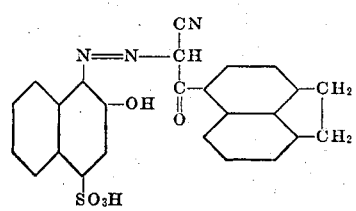

obtained by the coupling of the diazo compound of 1-amino-2-hydroxy-4-naphthalenesulfonic acid with 5-cyanoacetylacenaphthene in alkaline solution, is metalized in the following manner. A suspension of 4 parts of the dye in 50 parts of water and 8.5 parts of a basic chromic acetate solution containing 52 grams of chromium per liter is heated under reflux for a short time and then the pH is lowered by the addition of 26.5 parts of water and 15 parts of normal sulfuric acid. Refluxing is continued until precipitation of the metallic complex is complete and it is then removed by filtration and washed with water. The product dyes wool a deep blue-Bordeaux tint of excellent all-around fastness properties.

Example No. 23

The azo dyestuff of the following formula:

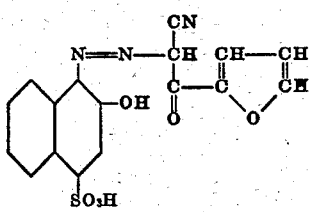

obtained by coupling the diazo compound of 1-amino-2-hydroxy-4-naphthalenesulfonic acid with alpha-furoylacetonitrile in alkaline solution is metalized in the following manner. A suspension of five parts of the dye in 50 parts of water and 18 parts of basic chromic acetate solution containing 52 grams of chromium per liter is heated under reflux for about one hour and the pH is then lowered by the addition of 50 parts of normal sulfuric acid. Refluxing is continued for a number of hours and during this time the metallic complex separates as a crystalline precipitate. It is then removed by filtration and washed with water. The product dyes wool a pleasing reddish shade of violet of good fastness properties.

The alpha-furoylacetonitrile used in the above example is obtained by reaction of 12.6 parts of methyl alpha furoate with 5.7 parts of sodium methylate and 5.3 parts of acetonitrile at 80–100°. The product is isolated by the addition of water to the cooled reaction mixture, filtration, and acidification of the filtrate. The precipitate so obtained is purified by washing with sodium bicarbonate solution. The product melts at 79.5–80.5°.

I claim:

1. Metalized azo dyes being complexes of metals of atomic weight from 52 to 64 and azo dyes having the following formula:

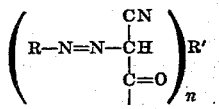

in which R is the residue of a diazotized amine included in the group consisting of amines of the benzene series and amines of the naphthalene series and having ortho to the azo group at least one metalizable group included in the group consisting of hydroxyl and carboxyl, R' is a cyclic radical included in the group consisting of aromatic, aralkyl, and hydroaromatic, and $n$ is an integer in the group consisting of 1 and 2.

2. Metalized dyes being complexes of metals of atomic weight from 52 to 64, and azo dyes having the following formula:

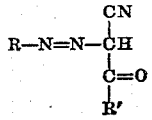

in which R is a radical of a diazotized amine included in the group consisting of amines of the benzene series and amines of the naphthalene series and having ortho to the azo group at least one metalizable group included in the group consisting of hydroxyl and carboxyl, and R' is a cyclic radical included in the group consisting of aromatic, aralkyl, and hydroaromatic radicals.

3. Metalized dyes being complexes of metals of atomic weight from 52 to 64, and azo dyes having the following formula:

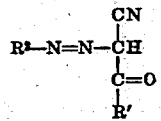

in which $R^2$ is a radical of the benzene series having ortho to the azo group at least one metalizable group included in the group consisting of hydroxyl and carboxyl, and R' is a cyclic radical included in the group consisting of aromatic, aralkyl and hydroaromatic radicals.

4. Metalized dyes being complexes of metals of atomic weight from 52 to 64, and azo dyes having the following formula:

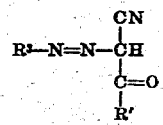

in which $R^3$ is an aryl radical of the naphthalene series having ortho to the azo group at least one metalizable group included in the group consisting of hydroxyl and carboxyl, and R' is a member of the group consisting of aromatic, aralkyl and hydroaromatic radicals.

5. Metalized dyes being complexes of metals of atomic weight from 52 to 64, and azo dyes having the following formula:

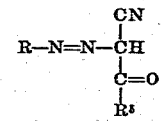

in which $R^5$ is an aryl radical and R is a radical of a diazotized amine included in the group consisting of amines of the benzene series and amines of the naphthalene series and having ortho to the azo group at least one metalizable group included in the group consisting of hydroxyl and carboxyl.

6. Metalized dyes being complexes of metals of atomic weight from 52 to 64, and azo dyes having the following formula:

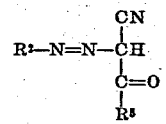

in which $R^2$ is a radical of the benzene series having ortho to the azo group at least one metalizable group included in the group consisting of hydroxyl and carboxyl and $R^5$ is an aryl radical.

7. Metalized dyes being complexes of metals of atomic weight from 52 to 64, and azo dyes having the following formula:

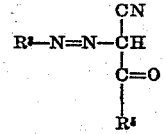

in which $R^3$ is an aryl radical of the naphthalene series having ortho to the azo group at least one metalizable group included in the group consisting of hydroxyl and carboxyl and $R^5$ is an aryl radical.

8. A metalized dye according to claim 2, in which the metal is chromium.

9. A metalized dye according to claim 3 in which the metal is chromium.

10. A metalized dye according to claim 4 in which the metal is chromium.

11. A metalized dye according to claim 5 in which the metal is chromium.

12. A metalized dye according to claim 6 in which the metal is chromium.

13. A metalized dye according to claim 7, in which the metal is chromium.

14. A metalized dyestuff according to claim 5 in which the metal is chromium and $R^5$ is phenyl.

15. A chromium complex of an azo dyestuff of the folowing formula:

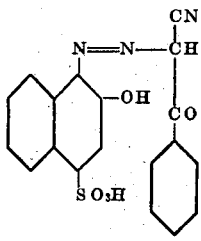

16. A chromium complex of an azo dyestuff of the folowing formula:

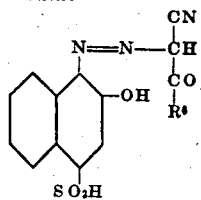

in which $R^6$ is a methoxyphenyl radical.

17. A chromium complex of an azo dyestuff of the following formula:

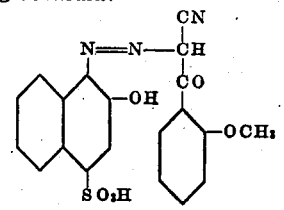

ROBERT SIDNEY LONG.